Sept. 15, 1953   J. E. HAWKINS   2,652,559
RADIO LOCATION SYSTEM
Filed Nov. 7, 1950   6 Sheets-Sheet 4

INVENTOR.
James E. Hawkins
BY Mason, Kolehmainen, Rathburn & Wyss
Att'ys

Sept. 15, 1953     J. E. HAWKINS     2,652,559
RADIO LOCATION SYSTEM

Filed Nov. 7, 1950     6 Sheets—Sheet 5

INVENTOR.
James E. Hawkins
BY
Mason, Kolehmainen, Rathburn & Wyss
Att'ys

Patented Sept. 15, 1953

2,652,559

UNITED STATES PATENT OFFICE 2,652,559

RADIO LOCATION SYSTEM

James E. Hawkins, Tulsa, Okla., assignor to Seismograph Service Corporation, Tulsa, Okla., a corporation of Delaware Application November 7, 1950, Serial No. 194,490

24 Claims. (Cl. 343—105)

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line joining the pair of transmitters, these iso-phase lines are spaced apart a distance equal to one-half of the wavelength of a wave having a frequency equal to the mean or average frequency of the radiated waves, and have diverging spacings at points on either side of this line. With this system arrangement, the position of a receiving point relative to a pair of hyperbolic iso-phase lines may be determined by measuring the phase relationship between continuous waves radiated from the pair of transmitters.

Since the point of location of the receiving point along the zone separating the two iso-phase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work.

To obviate this problem systems of the continuous wave hyperbolic type have been proposed (see Honore, United States Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While the described arrangement for obviating the phase synchronization problem is entirely satisfactory, another problem encountered in the operation of continuous wave systems is that of eliminating ambiguity from the phase measurements which provide the desired position information. Thus, while the two phase measurements identify the position of the receiving station relative to two intersecting pairs of hyperbolic iso-phase lines, they do not indicate which pairs of lines the indications are related to. This means that in operating the system the geographic location of the receiving system must be known at the start of movement of the receiving system relative to the transmitting stations and, furthermore, that the successive half wavelengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235, filed January 12, 1950, entitled Radio Location System and assigned to the same assignee as the present invention, there is disclosed a radio location system of the continuous wave type which is free not only of phase synchronization difficulties but also of ambiguity problems. In the system of the said copending application position indications are obtained having different sensitivities, termed phase sensitivities, insofar as the spacing of the iso-phase lines is concerned, More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities dependent upon the relative locations of the transmitters and determined by the sum of or difference between the mean frequencies of the carrier waves from which the pairs of beat frequency signals were derived. By selecting the frequencies employed with care, it is entirely practical and feasible that the high and low phase sensitivity reference signals be produced at the link transmitter of the system and modulated on a reference carrier wave for transmission to the mobile receiving unit. In accordance with the present invention all of the mixing or heterodyning of the beat frequency signals is carried out at the mobile unit, thereby simplifying the selection of the frequencies suitable for use in the system and making feasible the use of mechanical mixing equipment in place of the electrical mixing or heterodyning otherwise required.

It is an object of the invention, therefore, to provide an improved radio location system of the continuous wave type which is free of phase synchronization difficulties and the disadvantages pertaining to ambiguity, and in which the mixing of the beat frequencies to obtain position indications having phase sensitivities different from the phase sensitivity normally determined by the frequencies of the radiated waves is all carried out at the receiving point.

It is a further object of the present invention to provide a radio position finding system of the character described in which non-ambiguous position indications are obtained.

It is a still further object of the invention to provide a radio position finding system of the character described in which all of the mixing of the beat frequencies is carried out at the receiving point to provide a plurality of low phase sensitivity position indications and high phase sensitivity position indications, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing carrier frequencies suitable for efficient long range propagation.

It is also an object of the invention to provide improved receiving equipment for use in radio location systems of the above indicated character.

The invention, both as to its organization and method of operation, together with further objects and advantages thereof, will best be understood by reference to the specification taken in connection with the accompanying drawings, in which.

Figure 4:
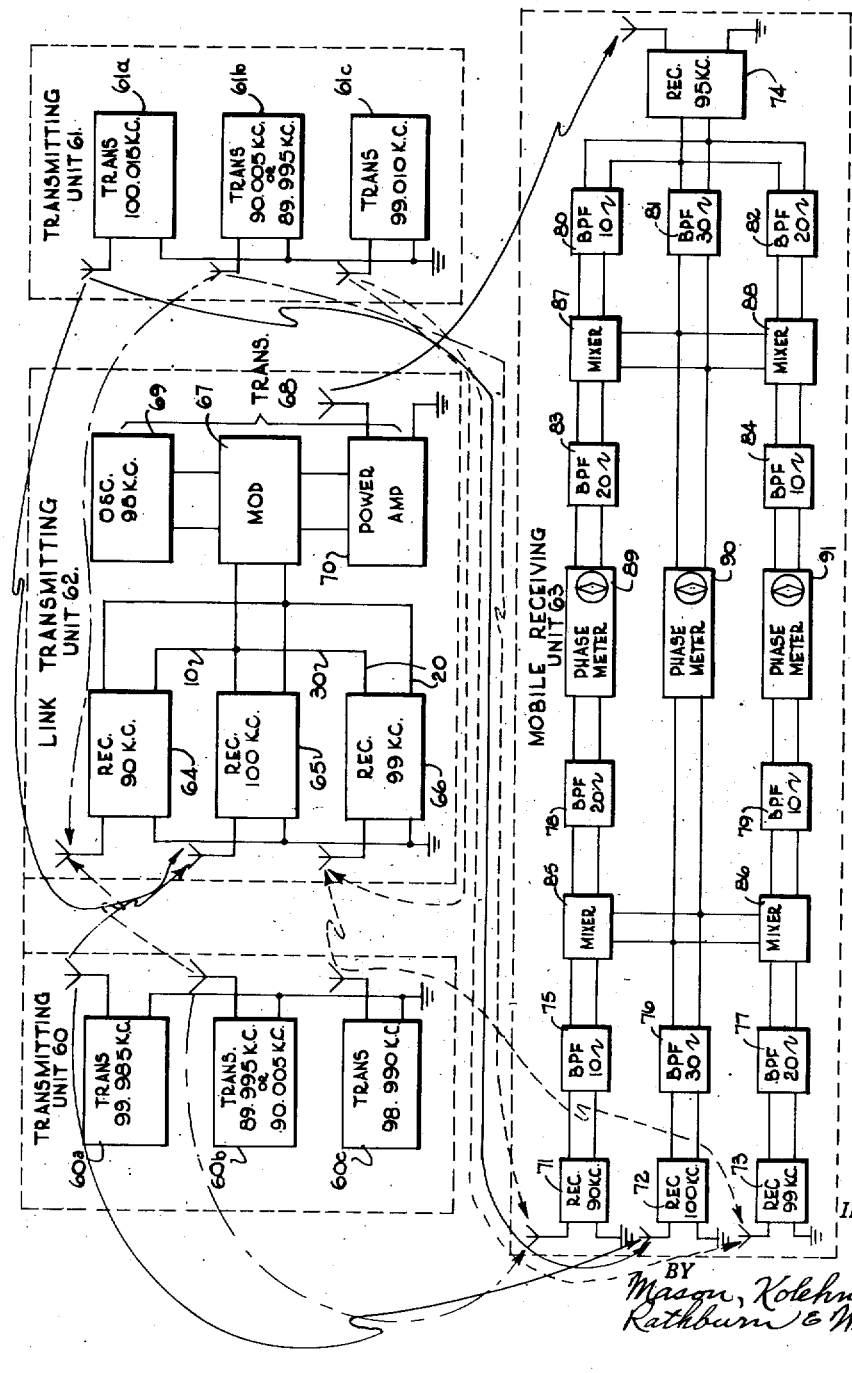
Figure 5:
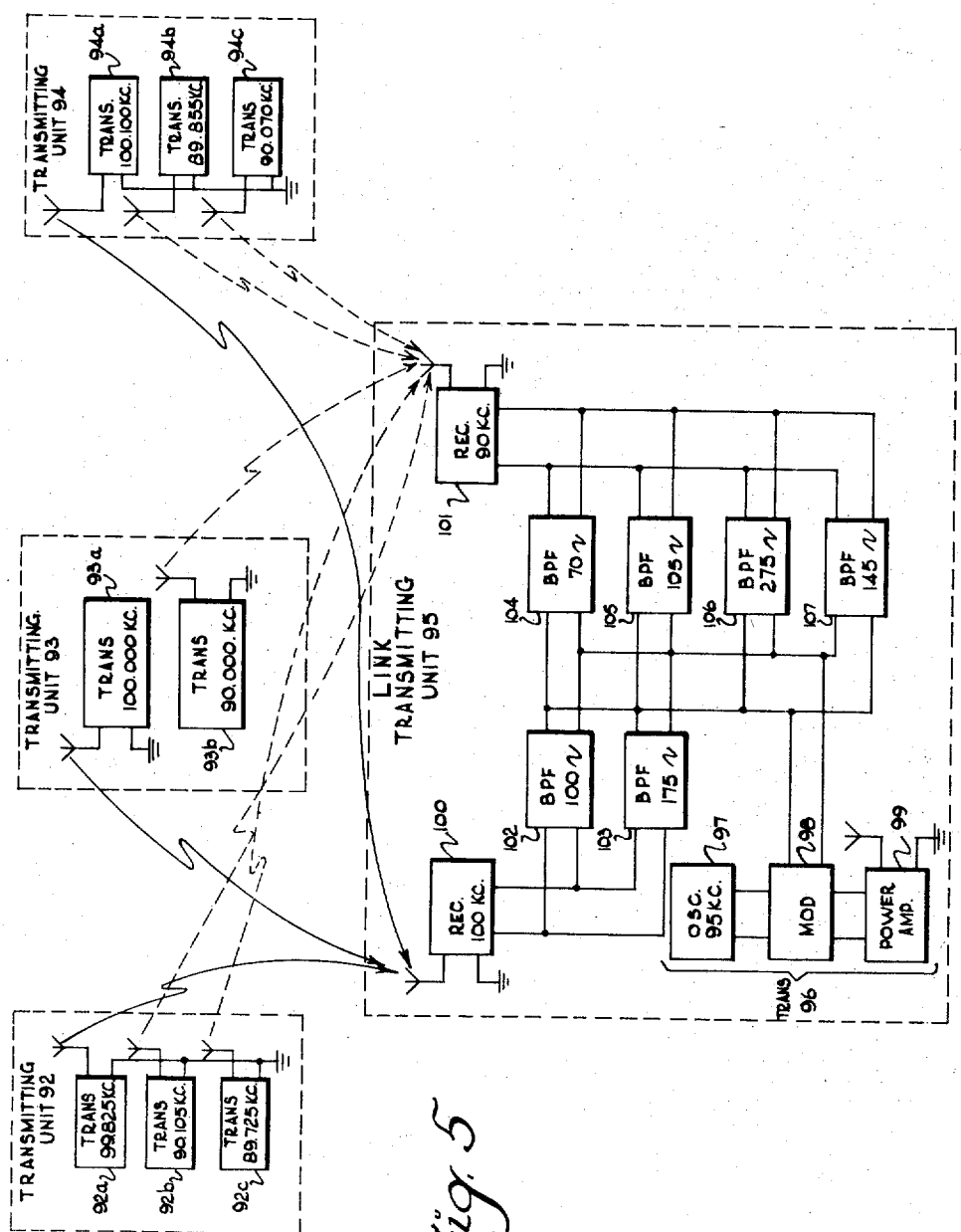
Figure 6:
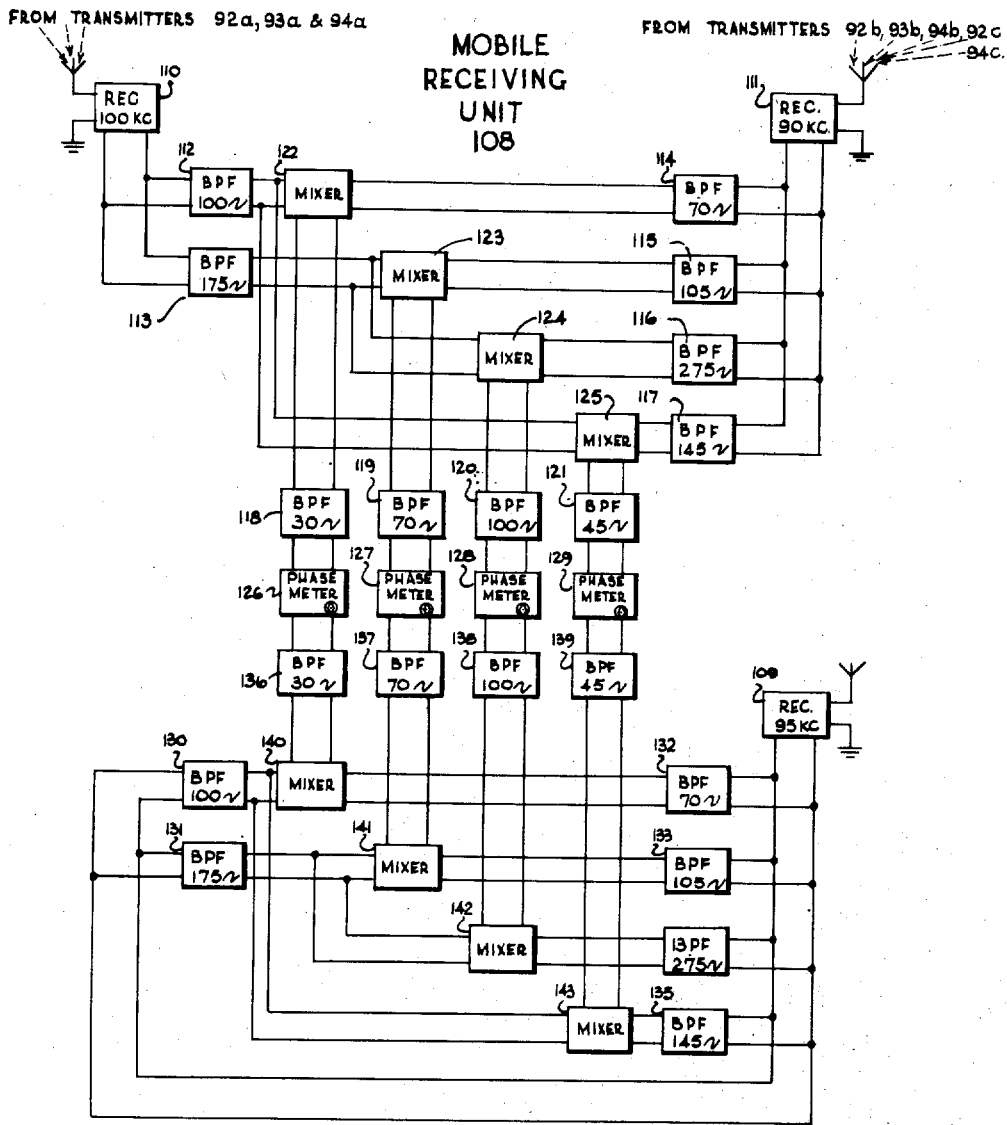

Fig. 4 is a diagrammatic representation of a two-foci position indicating system embodying the present invention for simultaneously providing position indications of high, medium and low phase sensitivities, respectively; and Figs. 5 and 6, when taken together, constitute a diagrammatic representation of a three-foci position indicating system embodying the present invention for providing an unambiguous position fix by means of two sets of indications, each set having high and low phase sensitivity indications, Fig. 5 showing the transmitting end of the system and Fig. 6 showing the mobile receiving equipment.

In the drawings arrows extending from the various transmitters to the various receivers have been employed to indicate the particular carrier waves radiated by the transmitters. Different types of arrows, i. e., solid line, broken line and dot-and-dash line arrows, have been employed in the various figures of the drawings to indicate different frequencies or groups of frequencies to which the receivers are selective.

Figure 1:
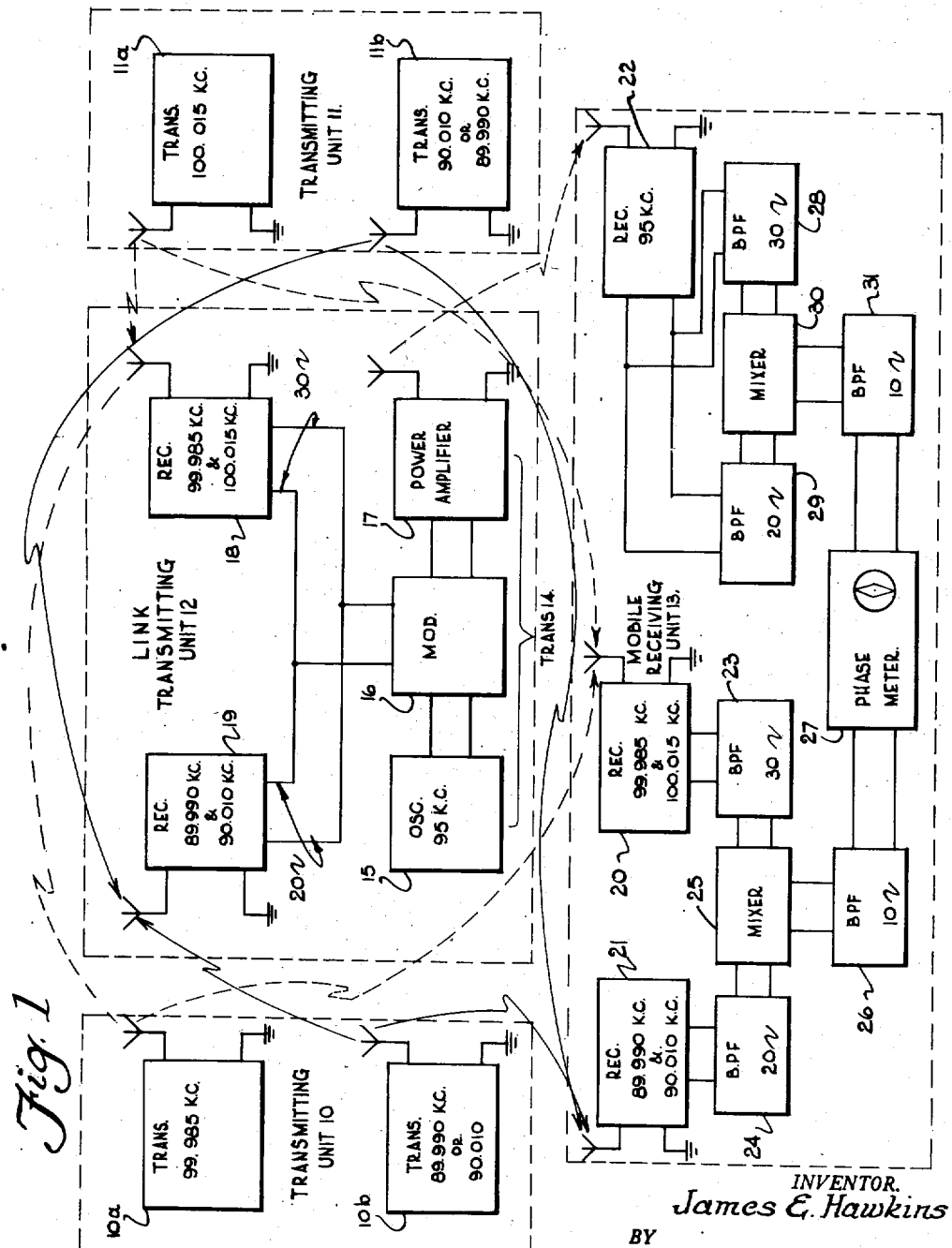
Fig. 1 is a diagrammatic representation of a simple two-foci position indicating system embodying the invention.

Referring now to the drawing and particularly to Fig. 1 thereof, the invention is illustrated as embodied in a two-foci hyperbolic continuous wave system for providing position information at a mobile receiving unit 13, which may be carried by a vessel or vehicle operating within the radius of transmission of a pair of spaced position signal transmitting units 10 and 11 and a fixed link or reference transmitting unit 12. As described more fully hereinafter, the transmitting units 10 and 11 are equipped with a first pair of transmitters 10a and 11a and a second pair of transmitters 10b and 11b for radiating position indicating carrier waves at frequencies which differ not only between pairs but within the respective pairs. As indicated in Fig. 1, the output frequency of the transmitter 10a and the output frequency of the transmitter 11a, forming the first transmitter pair, may be 99.985 kilocycles and 100.015 kilocycles, respectively, such that the difference or beat frequency therebetween is 30 cycles. While the transmitters 10b and 11b have been indicated in Fig. 1 as having alternate output frequencies of 89.990 kilocycles or 90.010 kilocycles, it will be understood that operation of this second pair of transmitters at these alternative frequencies constitutes an alternative condition of operation, and that the transmitters 10b and 11b will never be operated at the same frequencies. In describing the first condition of operation of the system shown in Fig. 1, it will be assumed that the transmitter 10b is operating at an output frequency of 89.990 kilocycles and the transmitter 11b is operating at an output frequency of 90.010 kilocycles, having a difference or beat frequency therebetween of 20 cycles.

The link or reference signal transmitting unit 12, which, as previously indicated, is employed in order to obviate the above mentioned difficulties attendant upon the problem of phase synchronization, is equipped, as is likewise more fully described hereinafter, with a reference signal transmitter 14 for radiating reference signals at a carrier frequency different from the respective frequencies of the transmitters 10a, 11a, 10b and 11b, for reception at the mobile receiving unit 13. Specifically, the reference signal transmitter 14 comprises a carrier wave oscillator 15 adapted for operation at 95 kilocycles, a modulator 16, and a power amplifier 17, whereby the output of the transmitter 14 constitutes a 95 kilocycle carrier wave having modulated thereon suitable beat frequency signals, which are developed and supplied to the modulator 16 from a pair of fixed tuned receivers 18 and 19.

The receiver 18 comprises a fixed tuned continuous wave receiver center tuned to a frequency of 100.000 kilocycles and is sharply selective to the 99.985 kilocycle and 100.015 kilocycle carrier waves, respectively radiated by the first pair of transmitters 10a and 11a, the selectivity of receiver 18 being such that the carrier waves radiated by the transmitters 10b and 11b are rejected in the radio frequency section of the receiver 18. The beat frequency of 30 cycles between the two carriers accepted by the receiver 18 is reproduced in the audio frequency section of the receiver and delivered as a 30 cycle beat frequency signal to the modulator 16 of the reference signal transmitter 14 for modulation on the 95 kilocycle carrier wave signal radiated by the transmitter 14. Similarly, the receiver 19 comprises a fixed tuned receiver center tuned to a frequency of 90.000 kilocycles and sharply selective to the 89.990 kilocycle and 90.010 kilocycle carrier waves, respectively radiated by the second pair of transmitters 10b and 11b, the selectivity of the receiver 19 being such that the carrier waves radiated by the transmitters 10a and 11a are rejected in the radio frequency section of the receiver 19. The beat frequency of 20 cycles between the two carriers accepted by the receiver 19 is reproduced in the audio frequency section of the receiver and delivered as a 20 cycle beat frequency signal to the modulator 16 of the reference signal transmitter 14 for modulation on the 95 kilocycle carrier wave signal radiated by the transmitter 14.

The mobile receiving unit 13, as shown in Fig. 1, comprises a plurality of fixed tuned receivers 20, 21 and 22, which are respectively center tuned to frequencies of 100.000 kilocycles, 90.000 kilocycles, and 95,000 kilocycles. The receiver 20 is sharply selective to the 99.985 and 100.015 kilocyclecarrier waves respectively radiated by the first pair of transmitters 10a and 11a, and the selectivity is such that the carrier waves radiated by the transmitters 10b, 11b and 14 are rejected in the radio frequency section thereof. Similarly, the receiver 21 is sharply selective to the 89.990 kilocycle and 90.010 kilocycle carrier waves respectively radiated by the second pair of transmitters 10b and 11b, and the selectivity is such that the carrier waves radiated by the transmitters 10a, 11a and 14 is rejected in the radio frequency section thereof. In the receivers 20 and 21, the beat frequencies of 30 cycles and 20 cycles, which respectively exist between the carriers respectively accepted by the receivers, are reproduced in the audio frequency sections thereof and delivered through suitable band pass filters 23 and 24, respectively, to opposite terminals of a mixer or heterodyning means 25, in which the 30 cycle and 20 cycle signals are heterodyned to produce a position indicating or difference beat frequency signal having a frequency of 10 cycles, which 10 cycle signal is supplied through a band pass filter 26 to a suitable phase meter 27. In the reference signal receiver 22, which is of the amplitude modulation type, the modulated carrier wave is received from the reference signal transmitter 14 and the 20 cycle and 30 cycle modulation components are reproduced at the output terminals of the receiver 22 and supplied through suitable band pass filters 28 and 29 to opposite terminals of a mixer or heterodyning means 30. In the mixer 30, the 30 cycle and 20 cycle signals from the receiver 22 are heterodyned to produce a 10 cycle reference signal which is supplied through a band pass filter 31 to the other set of input terminals of the phase meter 27 which functions to measure the phase relationship between the 10 cycle reference and position indicating signals, thereby providing a position indication of the mobile unit 13 relative to the transmitting units 10 and 11.

As previously indicated, the spacing of the iso-phase lines in continuous wave hyperbolic systems of the type disclosed in the above mentioned Honore patent is determined by the average frequency of the pair of radiated waves from which the position indicating or heterodyne signals are derived, and this spacing is equal to one-half the wavelength of a wave having such average frequency. Thus it may be said that the phase sensitivity of the position indicating signal, i. e., the rate at which the phase of the signal changes upon movement of the mobile receiving unit, is determined by the average frequency of the radiated carrier wave signals. Consequently, if the 30 cycle beat frequency signal produced at the mobile receiving unit by the receiver 20 were phase compared with a suitable reference signal in accordance with the teachings of the said Honore patent, the iso-phase lines representative of the same phase relationship between the standing waves produced by the transmitters 10a and 11a along the line joining the units 10 and 11 would be spaced apart a distance equal to one-half the wavelength of a wave having a frequency of 100.000 kilocycles, i. e., approximately 4920 feet. Similarly, if the 20 cycle beat frequency signal produced in the receiver 21 were phase compared with a suitable reference signal, the iso-phase lines representative of the same phase relationship between the standing waves produced by the transmitters 10b and 11b along the line joining the units 10 and 11 would be spaced apart a distance equal to one-half the wavelength of a wave having a frequency of 90,000 kilocycles, i. e., approximately 5467 feet. In each case the phase sensitivity of the position indicating signal, i. e., the rate at which the phase of the signal changes upon movement of the mobile receiving unit, is determined by the mean frequency of the radiated carrier signals.

However, the 30 cycle and 20 cycle beat frequency signals, in the embodiment of the invention shown in Fig. 1, are not used for purposes of phase comparison directly, but instead these signals are heterodyned to produce a position indicating signal, the phase sensitivity of which is determined by the ratio between the mean frequencies of the signals transmitted by the first pair of transmitters 10a and 11a and the second pair of transmitters 10b and 11b. Since the phase of the 20 cycle beat frequency signal changes approximately nine-tenths as fast as the phase of the 30 cycle beat frequency signal upon movement of the mobile unit, and since movement of the mobile unit toward the transmitting unit 11, for example, is toward the transmitters of higher frequency with respect to each pair, thereby providing a phase shift of the same sense, heterodyning the 20 cycle and 30 cycle beat frequency signals together, as previously described, produces an output signal, the phase of which will vary by the difference between the 100.000 kilocycle means frequency of the transmitters 10a and 11a and the 90.000 kilocycle mean frequency of the transmitters 10b and 11b. In other words, the phase sensitivity of the 10 cycle position indicating signal supplied from the mixer 25 through the band pass filter 26 to the phase meter 27 will correspond to a carrier signal of 10.000 kilocycles, which may be termed a phantom frequency equal to the difference between the real frequencies.

Thus, when the 10 cycle signal derived from the receivers 20 and 21 is phase compared with the 10 cycle reference signal derived from the receiver 22, only one-tenth the number of lanes, or 360 degree phase coincidences, between the transmitting units 10 and 11 will be obtained, as would have been obtained if the 30 cycle beat frequency, for example, had been phase compared, and these iso-phase lines will be spaced apart along the line joining the units 10 and 11 a distance equal to one-half the wavelength of a wave having a frequency of 10.000 kilocycles or a distance of approximately 49,200 feet. It will thus be observed that, by virtue of the double heterodyning action heretofore described, a position indicating signal is obtained having a low phase sensitivity, while still employing carrier frequencies which, if employed in the system of the Honore patent, would normally produce a phase sensitivity ten times greater.

Considering now the second condition of operation of the system shown in Fig. 1, that is, the operation during which the transmitters 10b and 11b are respectively operating at 90.010 kilocycles and 89.990 kilocycles, which is the reverse of the previously described operation, it will be apparent that the 30 cycle and 20 cycle beat frequency signals will be produced at the link transmitting unit 12 and modulated on the 95 kilocycle carrier radiated by the transmitter 14 in exactly the same manner as heretofore described, since reversal of the respective frequencies of the transmitters 10b and 11b has no effect on the link transmitting unit 12. Likewise, at the mobile receiving unit, a 20 cycle beat frequency indicating signal will be produced at the receiver 21, a 30 cycle beat frequency position indicating signal will be produced at the receiver 20, and heterodyning of these two beat frequency signals will produce a 10 cycle position indicating signal for phase comparison with the 10 cycle reference signal produced by mixing or heterodyning the 30 cycle and 20 cycle modulation components reproduced at the reference signal receiver 22. In this case, however, the phase sensitivity of the 10 cycle position indicating signal will be much higher than that obtained in the first condition of operation, for the reason that movement of the mobile receiving unit 13 toward the transmitting unit 11, for example, will be toward the transmitter of lower frequency so far as the transmitters 10b and 11b are concerned. Consequently, the phase shift will be of opposite sense, and upon heterodyning of the 20 cycle and 30 cycle beat frequency signals together, an output signal of 10 cycles is obtained, the phase of which varies in accordance with the sum of the 100.000 kilocycle mean frequency of the transmitters 10a and 11a and the 90.000 kilocycle mean frequency of the transmitters 10b and 11b. In other words, the phase sensitivity of the 10 cycle position indicating signal supplied to the phase meter 27 under this condition of operation corresponds to the phase sensitivity of a carrier signal of 190.000 kilocycles, which may be termed a phantom frequency, equal to the sum of the real frequencies.

Thus, when the 10 cycle position indicating signal is phase compared with the 10 cycle reference signal, there will be approximately 19 times the number of lanes, or 360 degree phase coincidences between the transmitting units 10 and 11 as would have been obtained if the 30 cycle beat frequency signal, for example, had been phase compared, and consequently these iso-phase lines will be spaced apart along the line joining the units 10 and 11 a distance equal to one-half the wavelength of a wave having a frequency of 190.000 kilocycles or a distance of approximately 2,590 feet. In other words, there will be 19 times the number of lanes, or 360 degree phase coincidences between the transmitting units 10 and 11 as are obtained from the phantom frequency equal to the difference between the real frequencies. Thus, under this condition of operation a position indicating signal is obtained having a high phase sensitivity, while employing carrier frequencies which, if employed in the system of the Honore patent, would normally produce a phase sensitivity only 10/19 as great. The manner in which the basic principles embodied in the system of Fig. 1, i. e., the provision of high or low phase sensitivity position indications, while eliminating the problems of phase synchronization and at the same time using carrier frequencies suitable for efficient long range propagation, may be employed in various combinations will become apparent from the following description of the position indicating systems shown in Fig. 4 and in Figs. 5 and 6.

From the foregoing explanation, it will be understood that the system as shown in Fig. 1 actually comprises one half of a complete radio location system. Thus, regardless of whether the sum or difference frequency principle described above is employed, a single set of lanes defined by hyperbolic iso-phase lines having the radiation points of the transmitting units 10 and 11 as foci are produced by the transmitting facilities embodied in these two units. The transmission facilities are, however, susceptible of rearrangement to convert the illustrated system into a ranging or distance determining system. To this end, the transmitting equipment embodied in the transmitting unit 11 is located on the mobile receiving unit 13 and the equipment provided in the link transmitting unit 12 is located at the same position as the transmitting equipment embodied in the unit 10. As thus rearranged, the signal transmission facilities of the system function to produce phase coincidence or iso-phase lines in space which are of circular contour and have the radiation point of the transmitting unit 10 as a common center. Thus the phase meter 27 provided at the mobile receiving unit 13 is controlled to indicate the position of the receiving point relative to a particular pair of iso-phase lines so that the distance separating the receiving unit 13 from the radiation point of the transmitting unit 10 is indicated by this meter. Aside from the change in contour of the phase coincidence or iso-phase lines produced by the described relocation of the system components, the mode of operation of the system is exactly the same as explained above. From this explanation it will be understood that if the difference frequency principle is utilized, the circular iso-phase lines produced in space will have a very wide spacing, whereas if the sum frequency principle is employed, the circular iso-phase lines will be spaced apart by relatively short distances.

Figure 2:
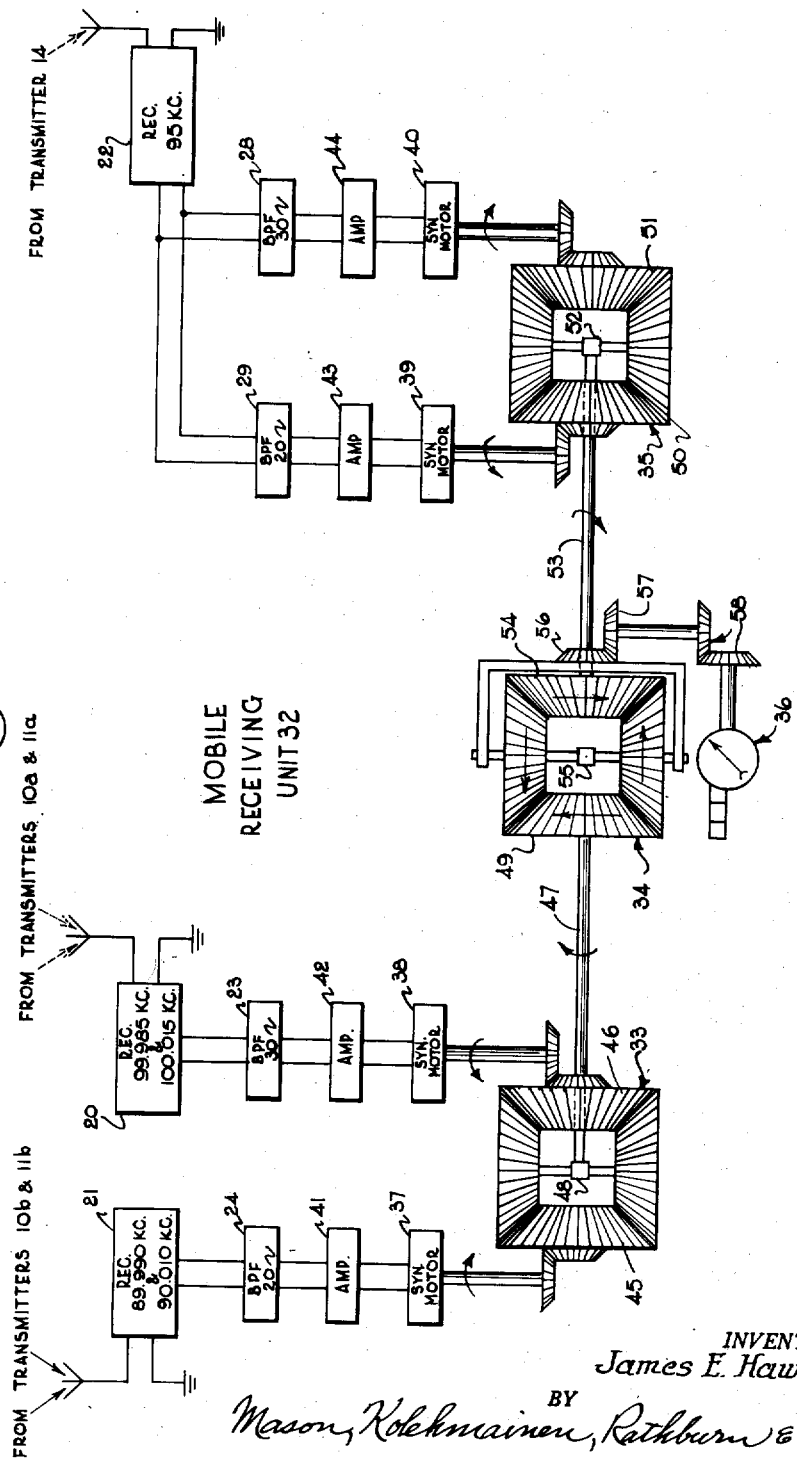
Fig. 2 is a diagrammatic representation of an alternative form of mobile receiving unit employing mechanical mixing and useful in the position indicating system of Fig. 1.

The mobile receiving unit 32 shown in Fig. 2 differs from the mobile receiving unit 13 of Fig. 1 only in that mechanical mixing of the beat frequencies is employed to obtain position indications having phase sensitivities dependent upon the sum and difference phantom frequencies. The receiving unit 32 may be substituted for the unit 13 in the system of Fig. 1 and will be described in that connection utilizing similar reference numerals to designate similar parts.

In addition to the fixed tuned receivers 20, 21 and 22 and the band pass filters 23, 24, 28 and 29 which function as described in connection with Fig. 1 to provide 20 cycle and 30 cycle beat frequency signals, the mobile receiving unit 32 comprises a plurality of mechanical mixers or differentials 33, 34 and 35, a mechanically driven integrating phase meter or revolution counter 36, a plurality of synchronous motors 37, 38, 39 and 40 and a plurality of power amplifiers 41, 42, 43 and 44.

The 20 cycle and 30 cycle beat frequency signals produced in the output circuits of the receivers 21 and 20 respectively are supplied through the band pass filters 24 and 23 to the amplifiers 41 and 42 the output circuits of which are respectively connected to the synchronous motors 37 and 38 for energization thereof. The output shafts of the motors 37 and 38 are connected, as shown, to drive the input bevel gears 45 and 46 of the differential or mixer 33 having an output shaft 47 which is driven by the spider 48 and in turn drives the input bevel gear 49 of the mixer 34. Similarly the 20 cycle and 30 cycle beat frequency signals reproduced in the output circuits of the reference signal receiver 22 are supplied through the band pass filters 29 and 28, respectively, to the amplifiers 43 and 44, the output circuits of which are respectively connected to the synchronous motors 39 and 40 for energization thereof to drive the input bevel gears 50 and 51 of the mixer 35. As shown, the spider 52 of the mixer 35 is connected to drive the output shaft 53 which in turn drives the input bevel gear 54 of the differential 34. The spider 55 of the differential 34 is connected as shown to drive a bevel gear 56, through which the shaft 53 passes loosely, and which, through other bevel gears 57 and 58, drives the integrating phase meter 36.

Although any suitable type of synchronous motor may be employed in conjunction with the required gearing to drive the output shaft of the motor at the desired speed, two pole synchronous motors may preferably be employed since this will result in the motor shafts rotating at a speed in revolutions per second equal to the frequency of the energizing signals in cycles per second. Thus the synchronous motors 37 and 39 which are energized by the 20 cycle beat frequency signals will rotate at a speed of 20 revolutions per second and the motors 38 and 40 will operate at a speed of 30 revolutions per second.

With the synchronous motors energized as shown, it will be seen that the output shafts 47 and 53 of the differentials 33 and 35, respectively, will be driven in the respective directions indicated by the arrows at a speed of 10 revolutions per second. Under these conditions the spider 55 of the differential 34 will remain stationary and no movement of the integrating meter 36 will occur. Movement of the mobile receiving unit 32 relative to the transmitting units 10 and 11 of Fig. 1 will cause a shift in phase, the equivalent of a change in frequency, in the beat frequency position indicating signals developed by the receivers 20 and 21 and supplied to the synchronous motors 38 and 37, respectively, and the resulting change in the speed of rotation of the shaft 47 relative to the speed of the shaft 53 will cause the spider 55 of the differential 34 to move so as to drive the integrating meter 36 to produce position indications. The rate at which the meter 36 is driven depends upon the phase sensitivity of the system in the same manner as in Fig. 1, that is, whether the sum or difference phantom frequencies are involved. If the first condition of operation described in connection with Fig. 1 exists so that movement of the mobile unit 32 toward the transmitter 11, for example, is toward the transmitters of higher frequency with respect to each pair of transmitters, a low phase sensitivity is obtained and under the second condition of operation a high phase sensitivity is obtained.

Figure 3:
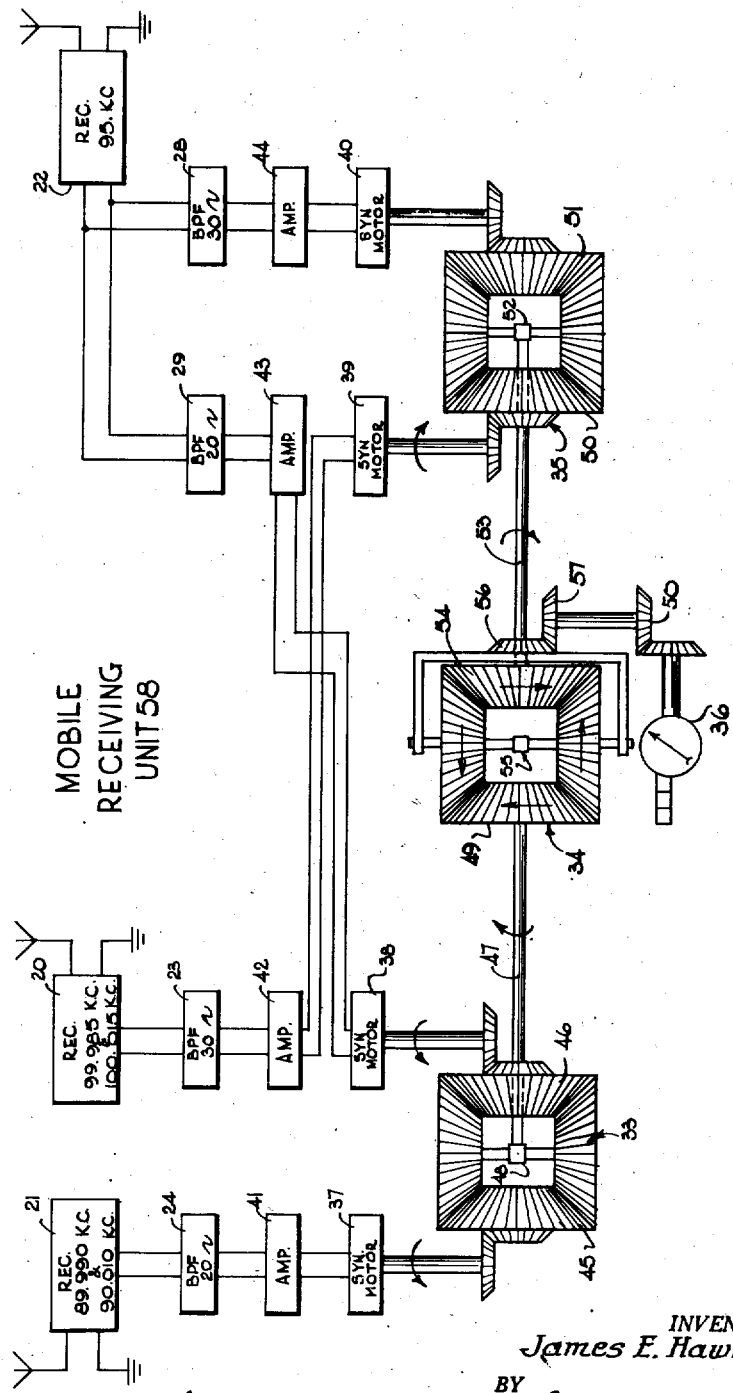
Fig. 3 is a diagrammatic representation similar to Fig. 2 of a still further form of mobile receiving unit useful in the system of Fig. 1.

The mobile receiving unit 58 shown in Fig. 3 is identical with the unit 32 of Fig. 2 except that in Fig. 3 the synchronous motor 38 is energized from the amplifier 43 instead of from the amplifier 42, and the synchronous motor 39 is energized from the amplifier 42 rather than the amplifier 43. Consequently, when the unit 58 is employed in the system of Fig. 1, the synchronous motors 37 and 38 are both energized at a frequency of 20 cycles, and the synchronous motors 39 and 40 are both energized at a frequency of 30 cycles. Under these circumstances neither of the output shafts 47 or 53 will be rotated by the respective differentials 33 and 35 except when movement of the mobile unit relative to the transmitting units takes place, and upon such movement of the receiving unit the spider 55 of the differential 34 will be moved in accordance with the resultant angular displacement between the shafts 47 and 53 so as to provide position indications at the integrating meter 36.

Referring now to Fig. 4, a position indicating system is shown which constitutes a two-foci system for simultaneously providing position indications of high, medium and low phase sensitivity. In the system of Fig. 4, a pair of spaced position signal transmitting units 60 and 61 and a link or reference signal transmitting unit 62 are provided for radiating signals to a mobile receiving unit 63. The transmitting units 60 and 61 include three pairs of transmitters 60a and 61a, 60b and 61b, and 60c and 61c, for radiating position indicating carrier waves at frequencies which differ not only between pairs but within the respective pairs, as in the previously described embodiments of the invention. The respective frequencies at which these various transmitters operate are indicated on the drawing, and, as in the case of Fig. 1, it will be understood that the alternative carrier frequencies indicated for the transmitters 60b and 61b are intended to represent different conditions of operation, and these two transmitters are not intended during any condition of operation to operate at the same frequency.

The link transmitter 62, as shown, comprises a plurality of receivers 64, 65 and 66, the output circuits of which are connected in parallel to a modulator 67 which forms a part of a reference signal transmitter 68, which also includes a 95 kilocycle carrier wave generator or oscillator 69 and a power amplifier 70.

The receivers 64, 65 and 66 are fixed-tuned receivers similar to the receivers 18 and 19 of Fig. 1 and are respectively center tuned to frequencies of 90.000 kilocycles, 100.000 kilocycles, and 99.000 kilocycles. The receiver 64 is thus sharply selective to the 89.995 kilocycle and 90.005 kilocycle carrier waves radiated by the transmitters 60b and 61b, and the beat frequency of 10 cycles between these two carrier waves is reproduced in the receiver 64 and supplied to the modulator 67 as a beat frequency signal having a frequency of 10 cycles. The receiver 65 is sharply selective to the 99.985 kilocycle and 100.015 kilocycle carrier waves radiated by the transmitters 60a and 61a, and the beat frequency of 30 cycles between these two carrier waves is reproduced in the receiver 65 and delivered as a 30 cycle beat frequency signal to the modulator 67. Similarly the receiver 66 is sharply selective to the 98.990 kilocycle and 99.010 kilocycle carrier waves radiated by the transmitters 60c and 61c, and the 20 cycle beat frequency between these carrier waves is reproduced in the receiver 66 and delivered to the modulator 67. It will thus be seen that three beat frequency signals having frequencies respectively equal to 10 cycles, 20 cycles and 30 cycles are supplied to the modulator 67 of the reference signal transmitter 68 for modulation on the 95 kilocycle carrier wave signal radiated by the transmitter 68 to the mobile receiving unit 63.

The mobile receiving unit 63, as shown in Fig. 4, comprises a plurality of fixed-tuned receivers 71, 72, 73 and 74, which are respectively center tuned to frequencies of 90.000 kilocycles, 100.000 kilocycles, 99.000 kilocycles and 95.000 kilocycles. In addition, the mobile receiving unit includes a plurality of band pass filters 75 to 84, inclusive, a plurality of mixers or heterodyne means 85, 86, 87 and 88 and a plurality of phase meters 89, 90 and 91.

As will be apparent from an inspection of Fig. 4, the receivers 71, 72 and 73 are identically arranged, and operate in the same manner as the receivers 64, 65 and 66 at the link transmitting unit 62 to provide in the output circuits thereof a plurality of beat frequency signals having frequencies of 10 cycles, 30 cycles, and 20 cycles, respectively, which are supplied to the left hand terminals of the band pass filters 75, 76 and 77. As indicated in Fig. 4, the output terminals of the band pass filters 75 and 76 are connected to the input terminals of the mixer 85 so as to supply 10 cycle and 30 cycle beat frequency signals thereto, which signals are heterodyned in the mixer 85 to produce a position indicating signal having a frequency equal to the difference between the 10 cycle and 30 cycle signals, that is a frequency of 20 cycles, and this 20 cycle reference signal is passed through the band pass filter 78 to the left hand terminals of the phase meter 89. Similarly the 30 cycle and 20 cycle beat frequency signals from the band pass filters 76 and 77 are delivered to the mixer 86, wherein they are heterodyned to provide a second position indicating signal having a beat frequency of 10 cycles, which is passed through the band pass filter 79 to the left hand terminals of the phase meter 91. Likewise the 30 cycle beat frequency signal is delivered from the band pass filter 76 directly to the left hand terminals of the phase meter 90. The receiver 74 at the mobile receiving unit 63 is of the amplitude modulation type and is sharply selective to the modulated carrier wave radiated by the link transmitter 68 at the link transmitting unit 62. The three beat frequency signals which are modulated on the reference signal carrier wave are reproduced in the receiver 74 and supplied to the band pass filters 80, 81 and 82. The band pass filters 80, 81, 82, 83 and 84 and the mixers 87 and 88 are identically arranged and operate in the same manner as the band pass filters 75, 76, 77, 78 and 79 and the mixers 85 and 86 to provide a plurality of reference signals having frequencies of 20 cycles, 30 cycles and 10 cycles which are supplied to the right hand terminals of the phase meters 89, 90 and 91 for phase comparison with the position indicating signals of equal frequency applied to the left hand terminals of the phase meters 89, 90 and 91.

As was the case in connection with the system of Fig. 1, the position indicating system of Fig. 4 is capable of alternative operations depending upon whether the transmitters 60b and 61b are operating at their respective higher or lower frequencies. Assuming, first, that the transmitter 60b is operating at a frequency of 89.995 kilocycles and the transmitter 61b is operating at a frequency of 90.005 kilocycles, the operation of the system shown in Fig. 4 is such as to produce, at the phase meters 89, 90 and 91, three separate position indicating signals, all of which are indicative of the position of the mobile receiving unit relative to the transmitting units 60 and 61, but which are all of different phase sensitivities. Thus, for the reasons explained in connection with the system of Fig. 1, the 20 cycle beat frequency position indicating signal which is derived from the 10 cycle and 30 cycle beat frequency signals produced by the receivers 71 and 72 will have a phase sensitivity determined by the difference between the mean frequencies of the pairs of carrier waves to which the receivers 71 and 72 respond. Accordingly, the 20 cycle position indicating signal supplied to the phase meter 89 has a phase sensitivity corresponding to a carrier signal of 10 kilocycles, and the distance between isophase lines represented by each 360 degree rotation of the phase meter 89 along the line joining the transmitting units 60 and 61 will be approximately 49,200 feet. This constitutes what may be termed in the system of Fig. 4 a position indication of medium phase sensitivity.

On the other hand, the 30 cycle position indicating signal supplied directly to the phase meter 90 from the band pass filter 76 without any second heterodyning operation has a phase sensitivity determined by the mean frequency of the carrier waves received at the receiver 72, i. e., 100.000 kilocycles, and consequently the iso-phase lines represented by each 360 degree rotation of the phase meter 90 will be spaced apart, along the line joining the transmitting units 60 and 61, a distance of approximately 4,920 feet, which constitutes, in the system of Fig. 4, a high phase sensitivity position indication.

The 10 cycle position indicating signal supplied to the phase meter 91 from the band pass filter 79 is derived from the 20 cycle and 30 cycle beat frequency signals produced by the receivers 73 and 72, respectively, and consequently will have a phase sensitivity determined by the difference between the pairs of carrier waves received by these receivers, i. e., between a mean frequency of 100.000 kilocycles and a mean frequency of 99.000 kilocycles. Thus the 10 cycle position indicating signal supplied to the phase meter 91 has a phase sensitivity corresponding to a difference or phantom frequency of 1.000 kilocycle, and the iso-phase lines corresponding to each 360 degrees of rotation of the phase meter 91 will be spaced apart, along the line joining the transmitting units 60 and 61, a distance of approximately 492,000 feet which constitutes, in the system of Fig. 4, a low phase sensitivity indication. It will thus be seen that three position indications are obtained, all of which represent the position of the mobile receiving unit 63 relative to the transmitting units 60 and 61 and having widely different phase sensitivities.

Assuming, for ease of discussion, that the distance of 4,920 feet between iso-phase lines in the hyperbolic pattern corresponding to the phase meter 90 constitutes approximately one mile, it will be seen that three hyperbolic patterns are provided in which the iso-phase lines are respectively spaced apart distances of one mile, ten miles and one hundred miles. Since the position of the mobile receiving unit 63 will usually be known within a distance of 100 miles, the three sets of indications may be employed accurately to determine the position of the mobile receiving unit 63 within such 100 mile range. If transmitting units 60 and 61 are 100 miles or less apart, that is, one 360 degree phase coincidence or less, no ambiguity can result in the low phase sensitivity indication, since 360 degrees or less will cover the entire area on one side of a line. The low phase sensitivity reading obtained from the phase meter 91 will give the relative position of the mobile receiving unit with respect to a known pair of iso-phase lines spaced 100 miles apart and will thus definitely establish within which of the ten pairs of iso-phase lines spaced ten miles apart and indicated by the phase meter 89 the mobile receiving unit is positioned. Similarly, indications of the phase meter 89 will establish the position of the mobile receiving unit with respect to that pair of ten mile iso-phase lines so as to determine within which pair of one mile iso-phase lines corresponding to the reading of the phase meter 90 the mobile unit is positioned. Thereupon the indications of the phase meter 90 will accurately determine the position of the mobile receiving unit with respect to the transmitting units 60 and 61 without ambiguity in so far as the particular iso-phase line is concerned.

Under the second condition of operation of the system of Fig. 4, i. e., with the transmitters 60b and 61b operating respectively at frequencies of 90.005 kilocycles and 89.995 kilocycles, the phase meters 90 and 91 are effective exactly as in the first assumed condition of operation to provide position indications of phase sensitivities such that the iso-phase lines are spaced apart 4,920 feet (approximately 1 mile) and 492,000 feet (approximately 100 miles) respectively. In this condition of operation, however, the relative values of the carrier waves radiated from the transmitters 60b and 61b are reversed and consequently the 20 cycle position indicating signal for the phase meter 89 derived from these carrier waves will have a phase sensitivity corresponding to a frequency equal to the sum of the mean frequencies, 100.000 kilocycles and 90.000 kilocycles, and the iso-phase lines represented by 360 degree rotation of the phase meter 89 will be spaced apart, along the line joining the transmitting units 60 and 61, a distance of 2,590 feet. With the above approximations, three hyperbolic patterns are thus obtained in which the iso-phase lines are respectively spaced apart one-half mile, one mile and 100 miles, the phase meter 89 thus providing the final high phase sensitivity position indication of extreme accuracy.

As previously indicated, the point of location of the receiving unit along the particular iso-phase line, as determined under either of the above described conditions of operation, will not be indicated by the system of Fig. 4 since only two position indicating transmitting units are employed, and it is therefore necessary, in order to obtain absolute determination of the position of the receiving point, to employ at least three spaced position signal transmitting units, different pairs of which function to provide a grid-like pattern of intersecting hyperbolic lines, as will be more fully explained in connection with Figs. 5 and 6.

In the three-foci position indicating system shown in Figs. 5 and 6 for providing an unambiguous position indication by means of two sets of high and low phase sensitivity indications, the transmitting system, as shown in Fig. 5, comprises three spaced position signal transmitting units 92, 93 and 94 and a link transmitting unit 95. As shown in Fig. 5, the transmitting unit 92 is provided with a plurality of transmitters 92a, 92b and 92c for radiating position indicating carrier waves at frequencies of 99.825 kilocycles, 90.105 kilocycles, and 89.725 kilocycles, respectively. The transmitting unit 93 is provided with similar transmitters 93a and 93b for radiating position indicating carrier waves at frequencies of 100.000 kilocycles and 90.000 kilocycles, respectively, and the transmitting unit 94 is provided with transmitters 94a, 94b and 94c for radiating position indicating carrier waves at frequencies of 100.100 kilocycles, 89.855 kilocycles, and 90.070 kilocycles, respectively.

The link transmitting unit 95 is provided with a reference signal transmitter 96 comprising a 95 kilocycle carrier wave generator or oscillator 97, a modulator 98, and a power amplifier 99 for radiating beat frequency signals as modulation components on a carrier wave having a frequency of 95 kilocycles. In addition the link transmitting unit 95 comprises a pair of fixed-tuned receivers 100 and 101, and a plurality of band pass filters 102 to 107, inclusive. The receiver 100 is center tuned to a frequency of 100.000 kilocycles and is sharply selective to the carrier waves of 99.825 kilocycles, 100.000 kilocycles and 100.100 kilocycles, respectively radiated by the transmitters 92a, 93a and 94a. The construction of the receiver 100 is such that the difference or beat frequencies between the pairs of carrier waves are reproduced in the audio frequency section of the receiver and appear in the output circuits thereof as beat frequency signals having frequencies respectively equal to 175 cycles (the beat frequency between the carrier waves from the transmitters 92a and 93a); 100 cycles (the difference between the frequencies of the carrier waves from the transmitters 93a and 94a); and 275 cycles (the beat frequency difference between the carrier waves from the transmitters 92a and 94a). Only the first two of the beat frequency signals appearing in the output circuits of the receiver 100 are utilized, these signals being separated out by the band pass filters 102 and 103, and if desired a suitable wave trap may be employed for eliminating the 275 cycle beat frequency signal. As shown in Fig. 5, the 100 cycle and 175 cycle beat frequency signals from the band pass filters 102 and 103 are supplied to the modulator 98 for modulation on the 95 kilocycle carrier wave radiated by the transmitter 96 to the mobile receiving unit 108 of Fig. 6.

The receiver 101 is center tuned to a frequency of 90.000 kilocycles and is sharply selective to all of the carrier waves radiated from the transmitters 92b, 93b, 94b, 92c and 94c. The construction of the receiver 101 is such that the beat frequencies between various pairs of the carrier waves received thereby are reproduced in the audio section thereof and supplied to the various band pass filters 104, 105, 106 and 107. These band pass filters are constructed to pass only frequencies which correspond to the beat frequencies between the 90.000 kilocycle carrier wave radiated by the transmitter 93b and the respective carrier waves radiated by the other transmitters 92b, 92c, 94b and 94c. Thus the band pass filter 104 passes the 70 cycle beat frequency signal representative of the beat frequency between the carriers of the transmitters 93b and 94c; the band pass filter 105 passes the 105 cycle beat frequency signal representative of the beat frequency between the carriers radiated by the transmitters 92b and 93b; the band pass filter 106 passes the 275 cycle beat frequency signal representative of the beat frequency between the carriers radiated by the transmitters 93b and 92c; and the band pass filter 107 passes the 145 cycle beat frequency signal representative of the beat frequency between the carriers radiated by the transmitter 93b and the transmitter 94b. Suitable wave traps may be provided, if desired, for eliminating other beat frequency signals produced in the receiver 101, such, for example, as the 215 cycle beat frequency signal representative of the beat frequency between the carrier waves radiated by the transmitters 94b and 94c, but by proper selection of the frequencies and by resort to sharply selective band pass filters, the necessity for such wave traps is usually avoided. As shown in Fig. 5, the beat frequency signals having frequencies of 70, 105, 275 and 145 cycles, respectively, are supplied from the band pass filters 104, 105, 106 and 107, respectively, to the modulator 98. Thus it will be seen that six beat frequency signals having frequencies of 100 cycles, 175 cycles, 70 cycles, 105 cycles, 275 cycles and 145 cycles are modulated on the 95 kilocycle carrier wave for radiation from the transmitter 96 to the mobile receiving unit 108 of Fig. 6.

The equipment at the mobile receiving unit 108, as shown in Fig. 6, comprises a plurality of receivers 109, 110 and 111, which are respectively fixed tuned to carrier frequencies of 95 kilocycles, 100 kilocycles and 90 kilocycles. Thus the receiver 109 is sharply selective to the modulated 95 kilocycle carrier wave radiated by the link transmitter 95, the receiver 110 is sharply selective to the position indicating carrier wave signals radiated from the transmitters 92a, 93a and 94a, and the receiver 111 is sharply selective to the position indicating carrier wave signals radiated from the transmitters 92b, 93b, 94b, 92c and 94c. Associated with the receivers 110 and 111 are suitable band pass filters 112 and 121, inclusive, and a plurality of mixers or heterodyning means 122, 123, 124 and 125. The receivers 110 and 111 and the band pass filters 112 to 117, inclusive, are identically arranged and operate in the same manner as the receivers 100 and 101 and the band pass filters 102 to 107, inclusive, at the link transmitting unit 95 to provide a plurality of beat frequency signals having frequencies of 100, 175, 70, 105, 275 and 145 cycles. The 70 cycle beat frequency signal is delivered from the band pass filter 114 to the mixer 122, wherein it is heterodyned with the 100 cycle beat frequency signal from the band pass filter 112 to produce a 30 cycle position indicating signal representative of the beat frequency between the signals supplied to the mixer 122, and this 30 cycle position indicating signal is delivered through the band pass filter 118 to a phase meter 126. Similarly, the 105 cycle beat frequency signal from the band pass filter 115 is delivered to the mixer 123, where it is heterodyned with the 175 cycle beat frequency signal from the band pass filter 113 to produce a 70 cycle position indicating signal which is delivered through the band pass filter 119 to a phase meter 127. In a similar manner the 275 cycle beat frequency signal and the 145 cycle beat frequency signal are delivered from the band pass filters 116 and 117, respectively, to the mixers 124 and 125, where they are respectively heterodyned with the 175 cycle and 100 cycle beat frequency signals from the band pass filters 113 and 112 to produce 100 cycle and 45 cycle position indicating signals which are supplied through the band pass filters 120 and 121, respectively, to phase meters 128 and 129.

Thus it will be seen that the receivers 110 and 111, the band pass filters 112 to 121, inclusive, and the mixer or heterodyning means 122 to 125, inclusive, function to provide a plurality of beat frequency position indicating signals having frequencies of 30 cycles, 70 cycles, 100 cycles and 45 cycles, respectively, which are delivered from the band pass filters 118, 119, 120 and 121 to the phase meters 126, 127, 128 and 129.

At the reference signal receiver 109 the six reference signals modulated on the carrier wave received from the transmitter 96 are reproduced and appear at the output terminals of the receiver 109 as beat frequency signals of 100 cycles, 175 cycles, 70 cycles, 105 cycles, 275 cycles and 145 cycles, respectively. Associated with the reference signal receiver 109 are suitable band pass filters 130 to 139, inclusive, which correspond in function and arrangement to the band pass filters 112 to 121 associated with the receivers 110 and 111 of the mobile unit 108 and a plurality of mixers or heterodyning means 140 to 143, inclusive, which correspond in function and arrangement to the mixers 122 to 125, inclusive, associated with the receivers 110 and 111 of the mobile unit 108. It will be apparent from the foregoing description of the receivers 110 and 111 and their associated equipment that the receiver 109, the band pass filters 130 to 139, inclusive, and the mixers 140 to 143, inclusive, function to provide a plurality of reference signals having frequencies of 30 cycles, 70 cycles, 100 cycles and 45 cycles, respectively, which reference signals are supplied through the band pass filters 136, 137, 138 and 139 to the respective opposite terminals of the phase meters 126 to 129, inclusive, whereby the phase meters function to measure the phase relationship between the respective pairs of position indicating and reference signals of equal frequency supplied thereto.

As is more fully explained hereinafter, the phase meters 126 and 129 respectively function to produce low and high phase sensitivity indications of the position of the mobile receiving unit relative to the spaced transmitting units 93 and 94, and the phase meters 127 and 128 respectively function to produce low and high phase sensitivity indications of the position of the mobile receiving unit 108 relative to the spaced transmitting units 92 and 93. More particularly, the 30 cycle position indicating signal with which the phase meter 126 is energized is derived from the 100 cycle and 70 cycle beat frequency signals respectively provided by the receivers 110 and 111, and, as heretofore explained, the 100 cycle beat frequency signal constitutes the beat frequency between the carrier waves radiated by the transmitters 93a and 94a, while the 70 cycle beat frequency signal represents the beat frequency between the carrier waves radiated by the transmitters 93b and 94c. Consequently the phase sensitivity of the 30 cycle position indicating signal corresponds to the first condition of operation described in connection with Fig. 1 and is determined by the difference between the mean frequencies of the pairs of carrier waves radiated by the two pairs of transmitter 93a, 94a, and 93b, 94c, the transmitter of higher frequency in each pair being located at the same transmitting unit, i. e., unit 94. Accordingly, since the difference between the mean frequencies of the pairs of carrier waves is approximately 10 kilocycles, each complete rotation of the phase meter 126 will indicate approximately ten miles of movement of the mobile receiving unit 108 along a line joining the transmitting units 93 and 94.

On the other hand, the 45 cycle position indicating signal with which the phase meter 129 is energized is derived from the 100 cycle and 145 cycle beat frequency signals respectively produced at the receivers 110 and 111, but in this case the 145 cycle beat frequency signal represents the beat frequency between the carrier wave signals transmitted by the transmitters 93b and 94b. The phase sensitivity of the 45 cycle position indicating signal accordingly corresponds to the second operating condition described in connection with Fig. 1 and is determined by the sum of the mean frequencies of the pairs of carrier waves radiated by the two pairs of transmitters 93a, 94a and 93b 94b, i. e., approximately 190 kilocycles, the transmitter of higher frequency in each pair of being located at different transmitting units. Consequently one complete revolution of the phase meter 129 will indicate approximately one-half mile of movement of the mobile receiving unit 108 along a line joining the transmitting units 93 and 94.

A similar analysis of the derivation of the 70 cycle and 100 cycle position indicating signals by which the phase meters 127 and 128 are energized will show that the phase meter 127 has a phase sensitivity determined by the sum of the mean frequencies between the pairs of transmitting units 92a, 93a and 92b, 93b, thus providing a high phase sensitivity indication wherein each complete revolution of the phase meter 127 indicates a movement of approximately one-half mile along a line joining the transmitters 92 and 93. Similarly the phase meter 128 has a phase sensitivity determined by the difference in the mean frequencies of the carrier waves radiated by the pairs of transmitters 92a, 93a and 93b, and 92c, whereby one complete revolution of the phase meter 128 indicates approximately ten miles of movement of the mobile receiving unit 108 along the same base line.

It will thus be seen that two pairs of intersecting sets of iso-phase lines of hyperbolic pattern are provided by the indications of the phase meters 126–129, inclusive, one pair comprising a hyperbolic grid in which the iso-phase lines are spaced approximately ten miles apart along the base lines between the respective pairs of transmitters, and the other pair comprising similar patterns in which the iso-phase lines are spaced approximately one-half mile apart. Accordingly all ambiguity within a known ten miles area is eliminated and, if desired, a third pair of intersecting patterns having the iso-phase lines spaced apart approximately 100 miles may be provided as in the system of Fig. 4.

It will be understood, of course, that the mechanical mixing arrangement disclosed in Figs. 2 and 3 may be substituted, if desired, for the corresponding pairs of electrical mixers and phase meters in the mobile receiving unit 108. Thus it will be apparent that by carrying out all of the mixing or heterodyning of the beat frequency signals at the mobile unit, the construction of the link transmitting unit is simplified, the use of mechanical mixing is made feasible, and selection of suitable carrier frequencies is simplified.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent is:

1. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for reproducing modulation components therefrom having frequencies respectively equal to said beat frequency signals, means for separately mixing said beat frequency signals and said modulation components to provide output components respectively representative of the beat frequencies between said beat frequency signals and between said modulation components, and means for comparing said output components to provide position indications.

2. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for reproducing modulation components therefrom having frequencies respectively equal to said beat frequency signals, means for mixing said beat frequency signals to provide a position indicating output component representative of the beat frequency between said beat frequency signals and having a sensitivity determined by the respective average frequencies of the pairs of space radiated signals from which said beat frequency signals are derived, means for similarly mixing said modulation components to provide a reference output component, and means for comparing said position indicating and reference output components.

3. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for reproducing modulation components therefrom having frequencies respectively equal to said beat frequency signals, a pair of synchronous motors respectively energized by said beat frequency signals, differential means driven by said synchronous motors to rotate an output shaft thereof at a speed representative of the beat frequency between said beat frequency signals, a second pair of synchronous motors respectively energized by said modulation components, differential means driven by said second pair of synchronous motors to rotate an output shaft thereof at a speed representative of the beat frequency between said modulation components, and differential means for comparing the speeds of rotation of said output shafts to provide a position indication.

4. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for reproducing modulation components therefrom having frequencies respectively equal to said beat frequency signals, a plurality of synchronous motors respectively energized by said beat frequency signals and said modulation components, a pair of differential means having output shafts, each of said differential means being driven by a pair of said synchronous motors, and other differential means driven by said output shafts to provide position indications.

5. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, means for receiving a modulated space radiated carrier signal and for reproducing modulation components therefrom having frequencies respectively equal to said beat frequency signals, a first pair of synchronous motors respectively energized by one of said beat frequency signals and the corresponding one of said modulation components, a second pair of synchronous motors respectively energized by the other beat frequency signal and modulation component, a pair of differential means respectively driven by said pairs of synchronous motors and having output shafts, and other differential means driven by said output shafts for providing position indications.

6. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving a modulated space radiated carrier signal and for reproducing modulation components therefrom having frequencies respectively equal to said beat frequency signals, heterodyning means responsive to said reproduced modulation components for producing a reference signal having a frequency equal to the frequency of said heterodyne signal, and phase measuring means for measuring the phase relationship between said heterodyne and reference signals.

7. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals and having a phase sensitivity determined by the relative values of the respective average frequencies of the pairs of space radiated signals from which said beat frequency signals are derived, means for receiving a modulated space radiated carrier signal and for reproducing modulation components therefrom having frequencies respectively equal to said beat frequency signals, heterodyning means responsive to said reproduced modulation components for producing a reference signal having a frequency equal to the frequency of said heterodyne signal, and phase measuring means for measuring the phase relationship between said heterodyne and reference signals.

8. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, one of said beat frequency signals constituting a first position-indicating heterodyne signal, heterodyning means responsive to said first and second beat frequency signals for producing a second position-indicating heterodyne signal having a frequency representative of the beat frequency between said first and second beat frequency signals and having a sensitivity different from that of said first heterodyne signal, means for receiving third and fourth beat frequency signals modulated upon a space radiated carrier signal and having frequencies respectively equal to the frequencies of said first and second beat frequency signals, said third beat frequency signal constituting a first reference signal having a frequency equal to the frequency of said first position-indicating heterodyne signal, heterodyning means responsive to said third and fourth beat frequency signals for producing a second reference signal having a frequency equal to the frequency of said second position-indicating heterodyne signal, and phase measuring means for respectively measuring the phase relationship between corresponding heterodyne and reference signals to provide separate position indications of different phase sensitivity.

9. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, one of said beat frequency signals constituting a first position indicating heterodyne signal having a sensitivity determined by the average frequency of the radiated pair of signals from which it is derived, heterodyning means responsive to said first and second beat frequency signals for producing a second position indicating heterodyne signal having a frequency representative of the beat frequency between said first and second beat frequency signals and having a sensitivity determined by the relative values of the respective average frequencies of the pairs of radiated signals from which said first and second beat frequencies are derived, means for receiving third and fourth beat frequency signals modulated upon a space radiated carrier signal and having frequencies respectively equal to the frequencies of said first and second beat frequency signals, said third beat frequency signal constituting a first reference signal having a frequency equal to the frequency of said first position-indicating heterodyne signal, heterodyning means responsive to said third and fourth beat frequency signals for producing a second reference signal having a frequency equal to the frequency of said second position-indicating heterodyne signal, and phase measuring means for respectively measuring the phase relationship between corresponding heterodyne and reference signals to provide separate position indications of difference phase sensitivity.

10. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing fourth, fifth and sixth beat frequency signals having frequencies respectively equal to the frequencies of said first, second and third beat frequency signals, said fourth beat frequency signal constituting a first reference signal, heterodyning means respectively responsive in pairs to said fourth and fifth and to said fourth and sixth beat frequency signals for producing second and third reference signals having frequencies respectively equal to the frequencies of said second and third heterodyne signals, and first, second and third phase measuring means for respectively measuring the phase relationship between corresponding heterodyne and reference signals to provide three position indications of different sensitivities.

11. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing fourth, fifth and sixth beat frequency signals modulated upon a common space radiated carrier and having frequencies respectively equal to the frequencies of said first, second and third beat frequency signals, said fourth beat frequency signal constituting a first reference signal, heterodyning means respectively responsive in pairs to said fourth and fifth and to said fourth and sixth beat frequency signals for producing second and third reference signals having frequencies respectively equal to the frequencies of said second and third heterodyne signals, and first, second and third phase measuring means for respectively measuring the phase relationship between corresponding heterodyne and reference signals to provide three position indications of different sensitivities.

12. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing fourth, fifth and sixth beat frequency signals having frequencies respectively equal to the frequencies of said first, second and third beat frequency signals, said fourth beat frequency signal constituting a first reference signal, heterodyning means respectively responsive in pairs to said fourth and fifth and to said fourth and sixth beat frequency signals for producing second and third reference signals having frequencies respectively equal to the frequencies of said second and third heterodyne signals, first, second and third phase measuring means for respectively measuring the phase relationship between corresponding heterodyne and reference signals, and band pass filter means for supplying said heterodyne and reference signals to said phase measuring means to provide three position indications of different sensitivities.

13. Wave signal receiving apparatus for translating received space radiated signals into position indications comprising a wave signal receiver for receiving a plurality of space radiated signals and for heterodyning said signals in pairs to produce a first pair of beat frequency signals having frequencies respectively representative of the beat frequencies between different pairs of said space radiated signals, other wave signal receiver means for receiving a plurality of other space radiated signals and for heterodyning said other signals in pairs to provide a second and a third pair of beat frequency signals having frequencies respectively representative of the beat frequencies between different pairs of said other space radiated signals, heterodyning means responsive to one beat frequency signal of said first pair and to said second pair of beat frequency signals for producing a first pair of position indicating heterodyne signals of different frequency and different sensitivity, other heterodyne means responsive to the other beat frequency signal of said first pair and to said third pair of beat frequency signals for producing a second pair of position indicating heterodyne signals of different frequency and different sensitivity, means for receiving fourth, fifth, and sixth pairs of beat frequency signals having different frequencies respectively equal to the frequencies of the signals constituting said first, second and third signals, heterodyning means responsive to one beat frequency signal of said fourth pair and to said fifth pair of beat frequency signals for producing a first pair of reference signals having frequencies respectively equal to the frequencies of said first pair of heterodyne signals, heterodyning means responsive to the other beat frequency signal of said fourth pair and to said sixth pair of beat frequency signals for producing a second pair of reference signals having frequencies respectively equal to the frequencies of said second pair of heterodyne signals, and phase measuring means for respectively measuring the phase relationship between corresponding heterodyne and reference signals.

14. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals, means for modulating said beat frequency signals upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the relative values of the respective average frequencies of the pairs of radiated signals from which said last mentioned beat frequency signals are derived, means at said receiving point for receiving said beat frequency signal modulated carrier and reproducing said first mentioned beat frequency signals, means for heterodyning said reproduced beat frequency signals to produce a reference signal having a frequency equal to the frequency of said position indicating signal, and phase measuring means for measuring the phase relationship between said position indicating and reference signals.

15. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals, means for modulating said beat frequency signals upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the difference between the respective average frequencies of the pairs of radiated signals from which said last mentioned beat frequency signals are derived, means at said receiving point for receiving said beat frequency signal modulated carrier and reproducing said first mentioned beat frequency signals, means for heterodyning said reproduced beat frequency signals to produce a reference signal having a frequency equal to the frequency of said position indicating signal, and phase measuring means for measuring the phase relationship between said position indicating and reference signals.

16. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals, means for modulating said beat frequency signals upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the sum of the respective average frequencies of the pairs of radiated signals from which said last mentioned beat frequency signals are derived, means at said receiving point for receiving said beat frequency signal modulated carrier and reproducing said first mentioned beat frequency signals, means for heterodyning said reproduced beat frequency signals to produce a reference signal having a frequency equal to the frequency of said position indicating signal, and phase measuring means for measuring the phase relationship between said position indicating and reference signals.

17. A position determining system comprising, a pair of spaced transmitting units, a plurality of pairs of transmitters, each pair of transmitters including a transmitter at each of said units for radiating to a receiving point position indicating signals of different frequencies, the transmitters at one of said units radiating signals of higher frequency than the transmitters of the corresponding pairs at the other of said units, heterodyning means responsive to signals derived from said pairs of transmitters for heterodyning said signals in pairs to produce a pair of beat frequency signals, means for modulating said beat frequency signals upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the difference between the respective average frequencies of the pairs of radiated signals from which said last mentioned beat frequency signals are derived, means at said receiving point for receiving said beat frequency signal modulated carrier and reproducing said first mentioned beat frequency signals, means for heterodyning said reproduced beat frequency signals to produce a reference signal having a frequency equal to the frequency of said position indicating signal, and phase measuring means for measuring the phase relationship between said position indicating and reference signals.

18. A position determining system comprising, a pair of spaced transmitting units, a plurality of pairs of transmitters, each pair of transmitters including a transmitter at each of said units for radiating to a receiving point position indicating signals of different frequencies, the transmitters at one of said units radiating signals of respectively higher and lower frequencies than the transmitters of the corresponding pairs at the other of said units, heterodyning means responsive to signals derived from said pairs of transmitters for heterodyning said signals in pairs to produce a pair of beat frequency signals, means for modulating said beat frequency signals upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the sum of the respective average frequencies of the pairs of radiated signals from which said last mentioned beat frequency signals are derived, means at said receiving point for receiving said beat frequency signal modulated carrier and reproducing said first mentioned beat frequency signals, means for heterodyning said reproduced beat frequency signals to produce a reference signal having a frequency equal to the frequency of said position indicating signal, and phase measuring means for measuring the phase relationship between said position indicating and reference signals.

19. A position determining system comprising a pair of spaced transmitting units, a plurality of pairs of transmitters, each pair of transmitters including a transmitter at each of said units for radiating to a receiving point position indicating signals of different frequencies, first heterodyning means responsive to a pair of signals derived from a first pair of transmitters for producing a first reference signal having a frequency representative of the beat frequency between said pair of derived signals, other heterodyning means responsive to a second pair of signals derived from a second pair of transmitters for producing a beat frequency signal having a frequency representative of the beat frequency between said second pair of derived signals, means for transmitting said reference signal and said beat frequency signal as modulation components to said receiving point, a pair of receivers at said receiving point for respectively receiving first and second pairs of signals respectively radiated by said first and second pairs of transmitters and for heterodyning said received signals in pairs to produce a first position indicating signal having a frequency representative of the beat frequency between said first pair of radiated signals and having a phase sensitivity determined by the average frequency of said first pair of radiated signals and to produce a beat frequency signal having a frequency representative of the beat frequency between said second pair of radiated signals, means for heterodyning said position indicating signal and said last mentioned beat frequency signal to produce a second position indicating signal having a frequency representative of the beat frequency between said first position indicating signal and said last mentioned beat frequency signal and having a phase sensitivity determined by the relative values of the respective average frequencies of said first and second pairs of radiated signals, means at said receiving point for receiving and reproducing said first reference signal and said first mentioned beat frequency signal, heterodyne means controlled by said reproduced reference signal and beat frequency signal for producing a second reference signal having a frequency representative of the beat frequency between said first reference signal and said reproduced beat frequency signal, and phase measuring means for measuring the phase relationship between said first position indicating and reference signals to provide a position indication of one sensitivity and for measuring the phase relationship between said second position indicating and reference signals to provide a position indication of different sensitivity.

20. A position determining system comprising three spaced transmitting units each of which includes a plurality of transmitters for radiating to a receiving point position indicating signals of different frequencies, heterodyning means responsive to signals derived from one of said transmitters at each of said units for producing a first pair of beat frequency signals having frequencies respectively representative of the beat frequencies between signals radiated from a first one of said units and from each of the second and third ones of said units, heterodyning means responsive to signals derived from others of said transmitters at said units for heterodyning said last mentioned signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, means for modulating said first, second and third pairs of beat frequency signals on a carrier for radiation to said receiving point, a wave signal receiver at said receiving point for receiving signals radiated from said first transmitter at each of said units and heterodyning said signals in pairs to produce a fourth pair of beat frequency signals having frequencies respectively representative of the beat frequencies between pairs of signals radiated from said first and second units and said first and third units and having phase sensitivities determined by the average frequencies of the radiated pairs of signals, other wave signal receiving means at said receiving point for receiving a plurality of other signals radiated from said other transmitters at said units and for heterodyning said other signals in pairs to produce a fifth pair of beat frequency signals having frequencies respectively representative of the beat frequencies between pairs of said other signals from said first and second units and having phase sensitivities respectively determined by the respective average frequencies of said pairs of other signals, and to produce a sixth pair of beat frequency signals having frequencies respectively representative of the beat frequencies between pairs of said other signals from said first and third units and having phase sensitivities respectively determined by the respective average frequencies of said last mentioned pairs of other signals, means controlled by one of said fourth pair of beat frequency signals and by said fifth pair of beat frequency signals to produce a first pair of position indicating signals having frequencies respectively representative of the beat frequencies between said one of said fourth pair and said fifth pair of beat frequency signals and having phase sensitivities respectively determined by the relative average values of the frequencies of the pairs of radiated signals from which said one of said fourth pair and said fifth pair of beat frequency signals are derived, means controlled by the other one of said fourth pair of beat frequency signals and by said sixth pair of beat frequency signals to produce a second pair of position indicating signals having frequencies respectively representative of the beat frequencies between said other of said fourth pair and said sixth pair of beat frequency signals and having phase sensitivities respectively determined by the relative average values of the frequencies of the pairs of radiated signals from which said other of said fourth pair and said sixth pair of beat frequency signals are derived, means at said receiving point for receiving said modulated carrier and for reproducing all of said first, second and third pairs of beat frequency signals, means at said receiving point controlled by one beat frequency signal of said first pair and by said second pair of beat frequency signals for producing a first pair of reference signals having frequencies respectively equal to the frequencies of said first pair of position indicating signals, means at said receiving point controlled by the other beat frequency signal of said first pair and by said third pair of beat frequency signals for producing a second pair of reference signals having frequencies respectively equal to the frequencies of said second pair of position indicating signals, phase measuring means for respectively measuring the phase relationship between the corresponding ones of said first pairs of position indicating and reference signals to provide two indications of different sensitivity of the position of said receiving point relative to said second transmitting unit, and other phase measuring means for respectively measuring the phase relationship between the corresponding ones of said second pairs of position indicating and reference signals to provide two indications of different sensitivity of the position of said receiving point relative to said third transmitting unit.

21. A wave signal transmission system comprising, a pair of spaced transmitting units, a plurality of pairs of transmitters for radiating signals of different frequencies, said transmitters of each pair being respectively disposed at different transmitting units, a plurality of heterodyning means respectively responsive to pairs of signals derived from said pairs of transmitters to produce beat frequency signals having frequencies respectively representative of the beat frequencies between the pairs of signals radiated by said pairs of transmitters, and means for modulating all of said beat frequency signals upon a carrier for space radiation.

22. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, and means for modulating said pair of beat frequency signals upon a carrier for space radiation.

23. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, the transmitter of said first pair at one of said units radiating signals of higher frequency than the transmitter of said first pair at the other of said units, the transmitter of said second pair at said one unit radiating signals of lower frequency than the transmitter of said second pair at said other unit, a pair of heterodyning means respectively responsive to said pairs of signals to produce a pair of beat frequency signals having frequencies respectively representative of the beat frequencies between the signals of said first pair and between the signals of said second pair, and means for modulating said pair of beat frequency signals upon a carrier for space radiation.

24. A wave signal transmitting system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of the beat frequencies between signals radiated by said one transmitter at one of said units and by said one of said transmitters at each of the others of said units, heterodyning means responsive to signals derived from others of said transmitters at said units for heterodyning said last mentioned derived signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, and means excited by said first, second and third pairs of beat frequency signals for modulating a space radiated common carrier.

JAMES E. HAWKINS.

References Cited in the file of this patent

UNITED STATES PATENTS

| Number | Name | Date |
| --- | --- | --- |
| 2,148,267 | Honore | Feb. 21, 1939 |
| 2,408,773 | Goodall | Oct. 8, 1946 |
| 2,513,315 | Hawkins | July 4, 1950 |

FOREIGN PATENTS

| Number | Country | Date |
| --- | --- | --- |
| 120,663 | Sweden | Jan. 20, 1948 |